United States Patent [19]

Hotsumi

[11] Patent Number: 4,627,589
[45] Date of Patent: Dec. 9, 1986

[54] HOUSING FOR ELECTRONIC APPARATUS OR THE LIKE

[75] Inventor: Minoru Hotsumi, Tokyo, Japan

[73] Assignee: NEC Corporation, Tokyo, Japan

[21] Appl. No.: 645,912

[22] Filed: Aug. 29, 1984

[30] Foreign Application Priority Data

Sep. 5, 1983 [JP] Japan .......................... 58-137730[U]

[51] Int. Cl.⁴ ............................................ A47B 91/00
[52] U.S. Cl. ....................................... 248/346; 70/58; 70/169; 248/553
[58] Field of Search ............... 248/346, 553, 552, 551, 248/220.2, 221.3, 221.4, 316.7; 109/52; 70/57, 58, 163, 166, 167, 169

[56] References Cited

U.S. PATENT DOCUMENTS

| | | | |
|---|---|---|---|
| 3,850,392 | 11/1974 | Gassaway | 248/553 |
| 3,993,278 | 11/1976 | Race | 70/58 X |
| 4,258,632 | 3/1981 | LaPointe | 109/52 X |
| 4,325,531 | 4/1982 | Omholt | 248/553 |

Primary Examiner—Ramon O. Ramirez
Attorney, Agent, or Firm—Laff, Whitesel, Conte & Saret

[57] ABSTRACT

An electronic apparatus or the like is accommodated in a housing which in turn is mounted on a mounting plate by means of interengaging lugs and recesses. An elongate space is defined in part of side walls of the housing for receiving a slide plate therein. The slide plate is moved through a lock. The mounting plate is fastened to a mobile body such as a motor vehicle.

9 Claims, 10 Drawing Figures

HOUSING FOR ELECTRONIC APPARATUS OR THE LIKE

BACKGROUND OF THE INVENTION

The present invention relates to a housing useful for fixing an electronic apparatus or any other desired apparatus to a mobile body such as a vehicle body.

Generally, a housing of a radio apparatus or any other electronic apparatus is accommodated in and fixed to a mobile body such as a luggage compartment of a motor vehicle by means of a mounting plate for holding the housing fixed in place. Specifically, the housing is fastened to the mounting plate by a number of screws while the mounting plate in turn is fastened to the vehicle body also by a number of screws. Such a prior art fixing system involves some problems, however. The screws which are essential for fixing the housing are apt to be lost and tightening so many screws is quite time-consuming. Since the screws are exposed to the outside, they are open to access by any person inviting the possibility of theft. Furthermore, the prior art fixing structure is susceptible to vibration so that the apparatus itself is susceptive to electronic failures.

SUMMARY OF THE INVENTION

It is therefore an object of the present invention to provide an improved housing for mounting an electronic apparatus or the like to a mobile body such as a motor vehicle.

It is another object of the present invention to provide a housing which allows an electronic apparatus or the like to be readily mounted on or demounted from a motor vehicle or like mobile body by simple manipulation.

It is another object of the present invention to provide a housing which frees an electronic apparatus or the like mounted on a motor vehicle or like mobile body from theft.

It is another object of the present invention to provide a generally improved housing for an electronic apparatus or the like.

An arrangement for accommodating and fixing an apparatus of the present invention comprises a housing for accommodating the apparatus therein. The housing has a first engaging member at one of opposite side walls thereof, and a second engaging member at the other of the opposite side walls. A space defining member defines an elongate space along the other side wall of the housing and constitutes part of the other side wall. A slide plate is disposed in the space to be slidable therealong. A lock is engaged with the slide plate to cause the slide plate to slide into motion. A housing mounting member has a third engaging member engagable with the first engaging member, a fourth engaging member engagable with the second engaging member, and a fifth engaging member engagable with the slide plate in a predetermined position of the slide plate.

In accordance with the present invention, an electronic apparatus or the like is accommodated in a housing which in turn is mounted on a mounting plate by means of interengaging lugs and recesses. An elongate space is defined in part of side walls of the housing for receiving a slide plate therein. The slide plate is moved through a lock. The mounting plate is fastened to a mobile body such as a motor vehicle.

The above and other objects, features and advantages of the present invention will become apparent from the following detailed description taken with the accompanying drawings.

DESCRIPTION OF THE PREFERRED EMBODIMENT

While the housing for an electronic apparatus or the like of the present invention is susceptible of numerous physical embodiments, depending upon the environment and requirements of use, a substantial number of the herein shown and described embodiment have been made, tested and used, and all have performed in an eminently satisfactory manner.

Figure 1:
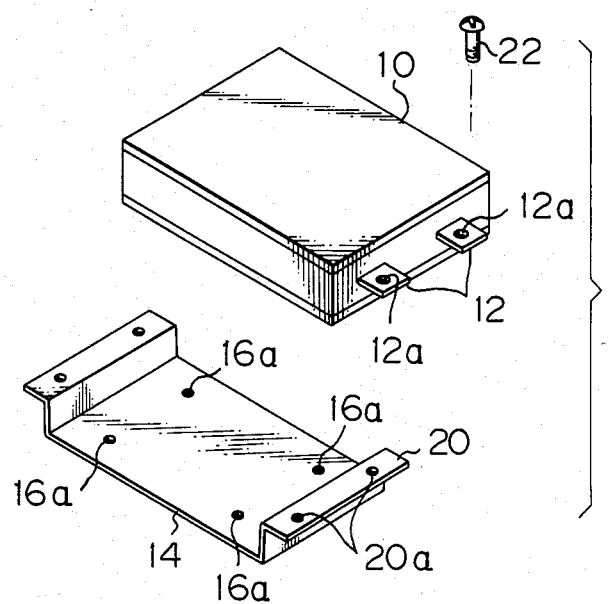
FIG. 1 is an exploded perspective view of a prior art arrangement of a housing for mounting an electronic apparatus or the like to a mobile body such as a motor vehicle and a fixture for mounting the housing.
Figure 2:
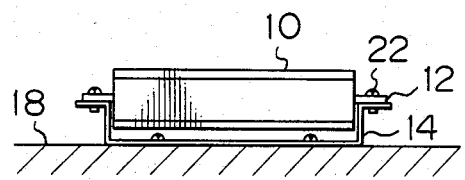
FIG. 2 is a side elevation of the housing and the fixture of FIG. 1 shown in an assembled position.

Before entering into detailed description of the present invention, a brief reference will be made to a prior art housing and a fixture for mounting a desired apparatus to a mobile body, shown in FIGS. 1 and 2. Hereinafter, let the apparatus be an electronic apparatus and the mobile body a motor vehicle, by way of example.

A housing 10 to be mounted on a motor vehicle is provided with a plurality of lugs 12 at opposite sides thereof. Each lug 12 is perforated with an opening 12a. A mounting plate, or fixture, 14 is dimensioned complementarily to the housing 10 and fixed in advance to a vehicle body 18 utilizing threaded holes 16a formed through the mounting plate 14. The plate 14 is bent at opposite ends to form flanges 20 and each of these flanges 20 is perforated with a plurality of threaded openings 20a, which will align with the openings 12a of the housing 10. In assembly, the housing 10 is laid in the mounting plate 14 with its openings 12a aligned with the threaded holes 20a and, then, they are fastened together by screws 22, thereby securely mounting the housing 10 to the vehicle body 18.

As previously described, such a prior art fixing structure is disadvantageous due to the use of many screws for mounting the housing 10 to the vehicle body 18. The screws are apt to be lost and have to be driven, consuming a disproportionate period of time. Since the screws 22 for fastening the housing 10 and plate 14 together are exposed to the outside and, therefore, easily accessible, there is a fear of the apparatus itself being stolen. Further, the prior art structure renders the apparatus quite susceptible to electronic failures due to vibration.

A preferred embodiment of the present invention which solves the above-discussed problems will hereinafter be described in detail.

Figure 3:
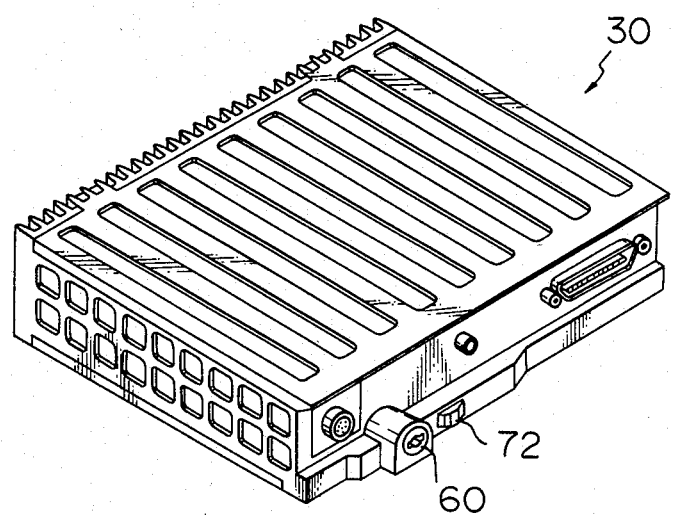
FIG. 3 is a perspective external view of a housing for mounting an electronic apparatus or the like to a mobile body such as a motor vehicle in accordance with the present invention.
Figure 4:
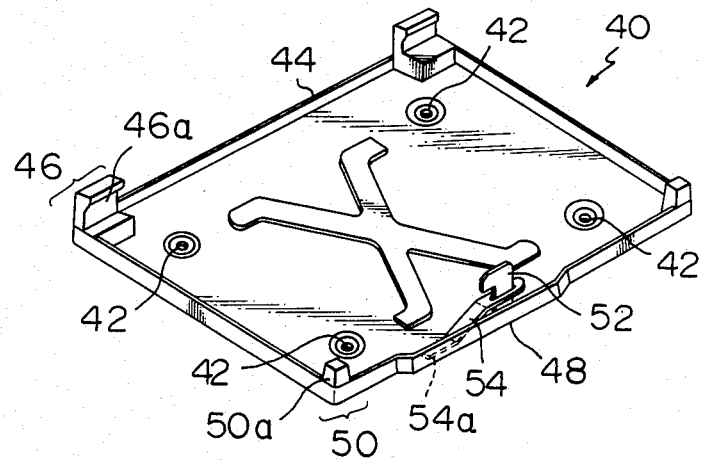
FIG. 4 is a perspective external view of a fixture for fixing the housing of FIG. 3.

Referring to FIG. 3, a housing in accordance with the present invention is shown and generally designated by the reference numeral 30. A mounting plate, or fixture, 40 for fixing the housing 30 is shown in FIG. 4. The housing 30 is shown in an exploded view in FIG. 5 and in a vertical section in FIG. 6. As shown in FIG. 6, lugs 34 extend from the lower end of one side 32 of the housing 30 and each have slants 34a which are inclined outwardly downwardly to progressively reduce the height. Recesses 38 are formed at the lower end of the other side 36 of the housing 30.

Figure 5:
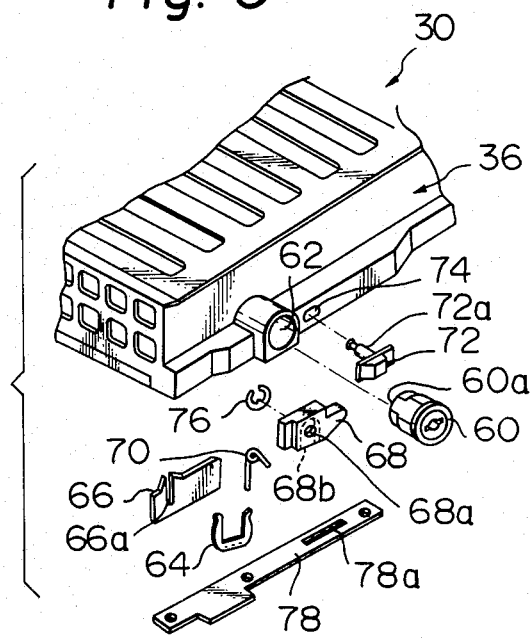
FIG. 5 is an exploded perspective view of the housing shown in FIG. 3.
Figure 6:
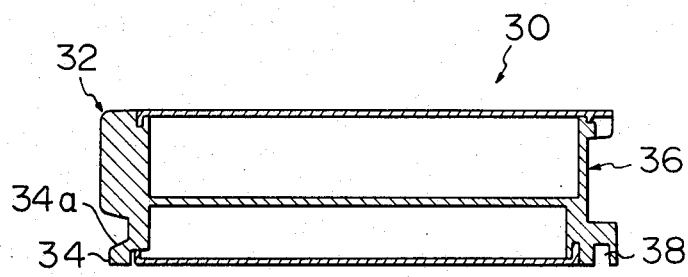
FIG. 6 is a vertical section of the housing shown in FIG. 3.

As best shown in FIG. 5, a lock 60 having a pin 60a is mounted in that side 36 of the housing 30 where the recesses 38 are formed. The pin 60a is rotatable 180 degrees about its axis. The lock 60 is received in a bore 62 formed in the side 36 of the housing 30 and fixed in place by a generally U-shaped, resilient retainer 64 made of metal. A slide plate, or slider, 66 has a vertically extending slot 66a. The pin 60a of the lock 60 is nested in the slot 66a so that the slider 66 is movable to the right and left along the housing side 36 when the lock 60 is rotated. A generally L-shaped plate 68 is arranged on the housing side 36 adjacent to the slider 66 and constantly biased by a spring 70 toward a thumb piece 72 (later described), that is, to the right in FIGS. 7C and 7D. The plate 68 is formed with a hole 68a and a recess 68b adapted to receive an E-ring as will be described.

As shown in FIG. 3, the thumb piece 72 is partly exposed to the outside at the housing side 36 and provided with a boss 72a which is engaged in the hole 68a of the plate 68. The thumb piece 72 is slidable to the right and left along a slot 74 formed in the housing side 36, with the boss 72a received in the slot 74. An E-ring 76 is engaged with the end portion of the boss 72a. The slider 66, L-shaped plate 68 and spring 70 are retained at the housing side 36 by a retainer plate 78, which has a rectangular slot 78a formed therethrough.

Figure 7A:
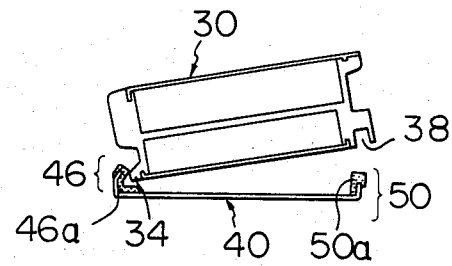
FIGS. 7A–7D are side elevations showing a procedure for fixing the housing of FIG. 3 to the fixture of FIG. 4.
Figure 7B:
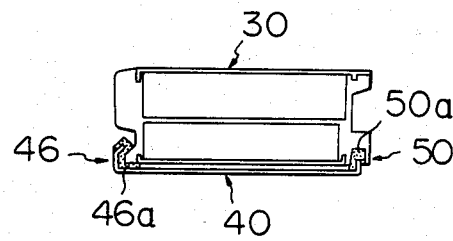
Figure 7C:
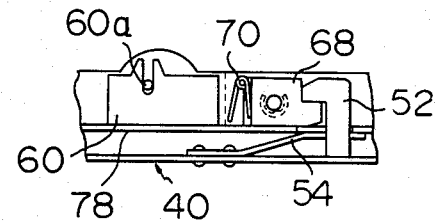
Figure 7D:
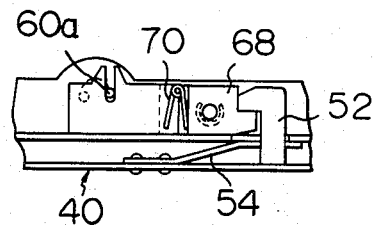

Referring to FIG. 4, the mounting plate 40 in accordance with the present invention is shaped by processing a rectangular sheet metal and fastened to a vehicle body by means of threaded holes 42 and screws. One side 44 of the mounting plate 40 is partly bent upwardly to form lugs 46. As shown in FIGS. 7A and 7B, an elastic piece 46a such as a rubber molding is fitted on each of the lugs 46. The lugs 46 are so shaped as to define concavities which respectively are engagable with the lugs 34 of the housing 30 (FIG. 6). The other side 48 of the mounting plate 40 is also formed with lugs 50 which respectively are engageable with the recesses 38 of the housing 30 (FIG. 6). The lugs 50, like the lugs 46, carry therewith elastic pieces 50a such as rubber moldings as shown in FIGS. 7A and 7B. The bottom of the plate 40 is partly cut and raised by sheet metal processing or the like to form an upright, generally inverse L-shaped projection 52 which is engageable with the L-shaped plate 68. A leaf spring 54 is fixed to the plate 40 by means of a rivet or any other suitable fastening means 54a.

A procedure for fixing the housing 30 shown in FIG. 3 to the mounting plate 40 is shown in elevations in FIGS. 7A–7D. As shown in FIG. 7A, the procedure starts with engaging the lugs 34 of the housing 30 respectively in the concavities of the lugs 46 of the mounting plate 40. Then, the housing 30 is lowered to mate the recesses 38 with the lugs 50 while pressing the resilient members 46a (FIG. 7B) outwardly. At this instant, the inverse L-shaped projection 52 touches the L-shaped plate 68 through the slot 78a of the retainer plate 78 and cams it leftwardly in FIG. 7C against the action of the spring 70. The L-shaped plate 68 is in due course caused by the spring 70 to snap rightwardly in FIG. 7C in latching engagement with the inverse L-shaped projection 52, whereby the housing 30 is fixed to the mounting plate 40. Thereafter, the lock 60 is rotated clockwise by a key (not shown) to move the slider 66 to the right and, thereby, prevent the L-shaped plate 68 from moving to the left. In such a latched position, the housing 30 cannot be removed from the mounting plate 40 unless the lock 60 is rotated.

To unlatch the housing 30 from the mounting plate 68, the lock 60 is rotated counterclockwise to move the slider 66 to the left and, then, the thumb piece 72 is moved to the left by hand. This releases the L-shaped plate 68 from the inverse L-shaped projection 52 and causes the housing 30 to be raised about its lugs 34 by the left spring 54. In this position, the housing 30 can be easily pulled up out of the mounting plate 40.

In summary, it will be seen that the present invention provides a housing which can be fixed and unfixed by simple manipulation, yet features a perfect antitheft structure employing a lock. Meanwhile, since an elastic member intervenes between the housing and a mounting plate at their every interengaging place, a minimum of vibration is allowed to propagate to the housing. Further, elimination of the need for fastening by screws enhances speedy fixing and unfixing operations and, naturally, obviates the fear of loosing the screws.

Various modifications will become possible for those skilled in the art after receiving the teachings of the present disclosure without departing from the scope thereof.

What is claimed is:

1. An arrangement for accommodating and fixing an apparatus, comprising:
    a housing for accommodating the apparatus therein, said housing having a first engaging member at one of opposite side walls thereof and a second engaging member at the other of said opposite side walls;
    a space defining member for defining an elongate space along said other side wall of said housing and constituting part of said other side wall;
    a slide plate disposed in said space to be slidable therealong;
    a lock engaged with said slide plate to cause said slide plate into a sliding motion; and
    housing mounting means for mounting the housing, said housing mounting means having a third engaging member engagable with the first engaging member, a fourth engaging member engagable with the second engaging member, and a fifth engaging member engagable with the slide plate in a predetermined position of the slide plate.

2. An arrangement as claimed in claim 1, in which the first and second engaging members respectively are formed in lower portions of said one side wall and said other side wall of the housing.

3. An arrangement as claimed in claim 1, in which the first engaging member comprises a lug having slant, the third engaging member comprising a lug with which said lug having said slant is engagable.

4. An arrangement as claimed in claim 3, in which said lug constituting the third engaging member is covered with an elastic member.

5. An arrangement as claimed in claim 1, in which the second engaging member comprises a recess, the fourth engaging member comprising a lug to be engagable with said recess which constitutes the second engaging member.

6. An arrangement as claimed in claim 5, in which said lug constituting the fourth engaging member is covered with an elastic member.

7. An arrangement as claimed in claim 1, in which the housing mounting means comprises a mounting plate formed with a plurality of threaded holes for fixing.

8. An arrangement as claimed in claim 7, in which said mounting plate is fixed to a vehicle body through said threaded holes.

9. An arrangement as claimed in claim 1, in which the apparatus is an electronic apparatus.

* * * * *